March 5, 1968 J. PICKLES Re. 26,356
WINDOW LIFT GEAR
Original Filed Nov. 27, 1962 2 Sheets-Sheet 1
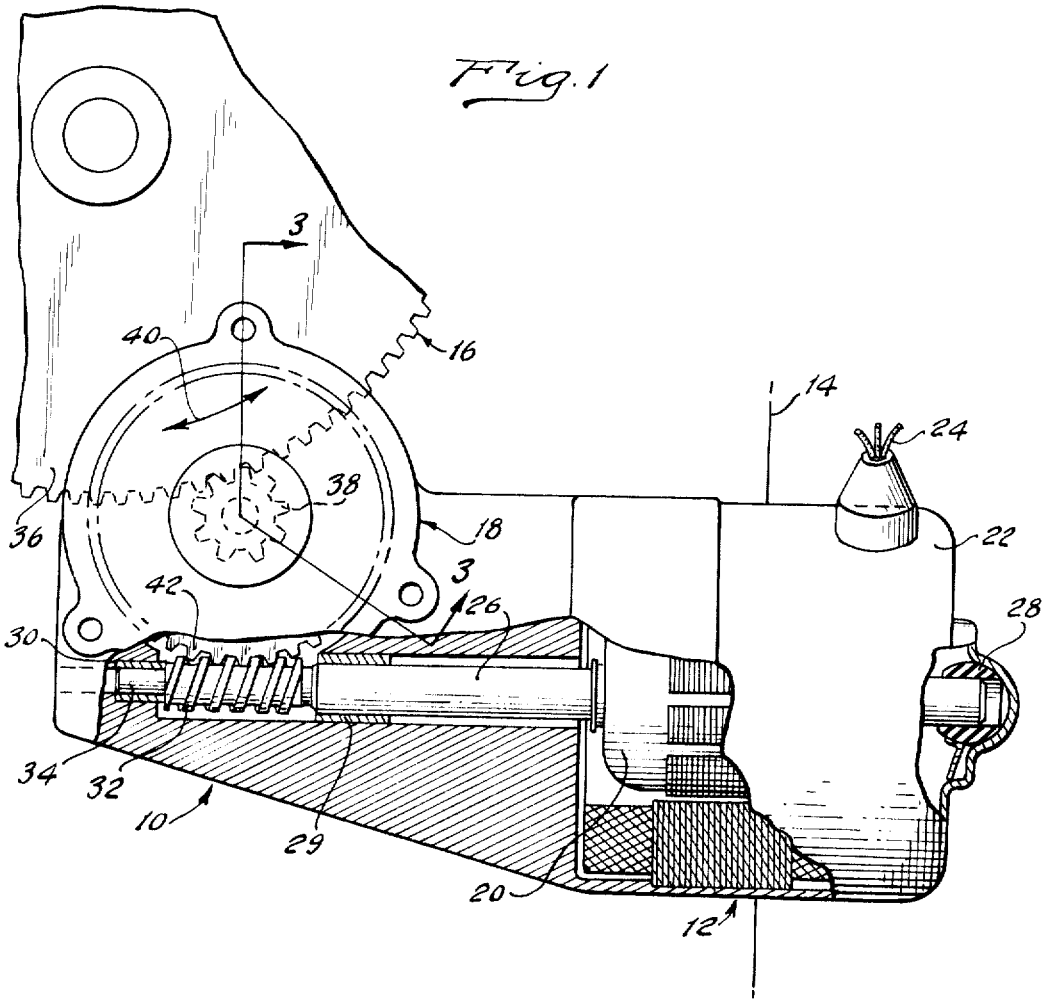
INVENTOR.
JOSEPH PICKLES.
BY Whittemore Hulbert & Belknap
ATTORNEYS

WINDOW LIFT GEAR

Original Filed Nov. 27, 1962 2 Sheets-Sheet 2

INVENTOR.
JOSEPH PICKLES
BY Whittemore
Hulbert & Belknap
ATTORNEYS

United States Patent Office

Re. 26,356
Reissued Mar. 5, 1968

26,356
WINDOW LIFT GEAR

Joseph Pickles, Bloomfield Hills, Mich., assignor to Ferro Stamping Company, Detroit, Mich., a corporation of Michigan Original No. 3,208,298, dated Sept. 28, 1965, Ser. No. 240,275, Nov. 27, 1962. Application for reissue July 12, 1967, Ser. No. 661,144
9 Claims. (Cl. 74—411)

Matter enclosed in heavy brackets [ ] appears in the original patent but forms no part of this reissue specification; matter printed in italics indicates the additions made by reissue.

The invention relates to yieldable couplings and refers more specifically to a gear coupling between window drive means and window moving linkage which is yieldable only after a predetermined torque is applied thereto whereby substantially uniform window motion may be effected on actuation of the window drive means while yielding of the gear coupling is permitted at the limits of window travel to prevent jamming thereof.

In the past yieldable couplings have been known for use in conjunction with power operated automobile windows or similar structure wherein yielding of the coupling between the linkages providing window movement and the window drive means is necessary to prevent jamming of the structure at the ends of the travel thereof due to inertia of the drive means. Prior known yieldable couplings have consisted of elastic material such as rubber so arranged in a coupling that on any variation in the force applied to the coupling, compression of the elastic material has taken place.

Thus with the prior yieldable couplings the yielding of the coupling has been proportional to the resistance offered to movement of the driven object. A jerky or non-uniform movement of the driven object may therefore result due to use of the prior known yieldable couplings. For example, during opening and closing of automobile windows driven through prior known flexible couplings, each time the pressure on the window resisting opening or closing thereof is varied the speed of movement of the window in an open or closed direction will increase or decrease depending on the direction of change of resistance to movement thereof.

It is therefore one of the objects of the present invention to provide an improved yieldable coupling for use in conjunction with power operated vehicle windows and the like.

Another object is to provide a yieldable coupling which is yieldable only after a predetermined torque has been applied thereto.

Another object is to provide power operating mechanism for vehicle windows or the like including a yieldable coupling positioned between window drive means and window moving linkage for uniformly driving the window moving linkage at torques below a predetermined torque to produce uniform window movement and yieldable at torques above the predetermined torque whereby jamming of the window is prevented at the limits of the travel thereof.

Another object is to provide structure as set forth above wherein the yieldable coupling comprises a driven gear having an annular recess in one side thereof, prestressed resilient means within said annular recess and a driving pinion including portions exteding into said anular recess and engaged with said resilient means therein whereby the prestressed resilient means urges said pinion into a predetermined position with respect to said gear.

Another object is to provide an improved yieldable coupling which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a partly broken away elevation view of a portion of vehicle window power lift structure including a yieldable coupling constructed in accordance with the invention.

Figure 3:
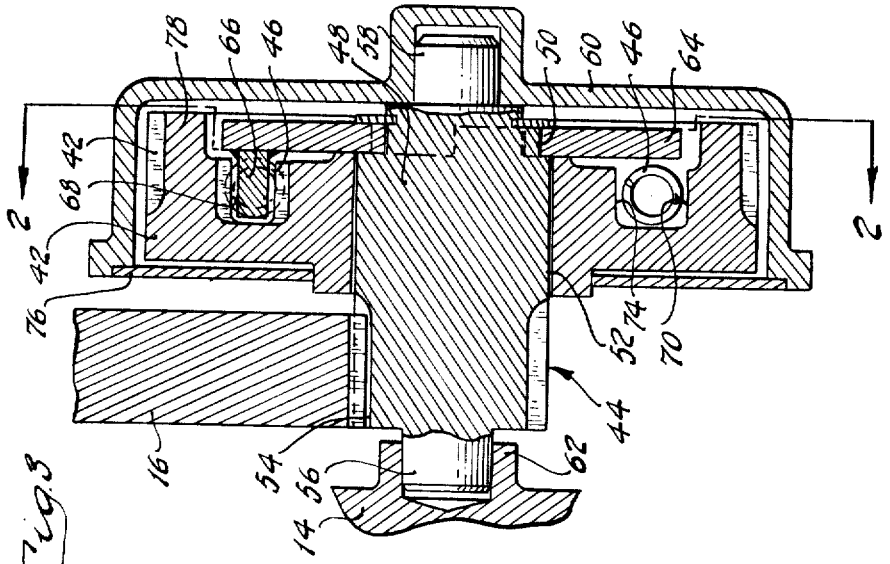
FIGURE 3 is an enlarged partial section view of the flexible coupling portion of the window lift structure illustrated in FIGURE 1 taken substantially on the line 3—3 in FIGURE 1.

With particular reference to the figures of the drawing one embodiment of the present invention will now be considered in detail.

The vehicle window lift structure 10 shown in FIGURE 1 comprises the automatic window drive means 12 secured to a vehicle door panel 14 by convenient means (not shown), the window moving linkage 16 for moving the vehicle door window (not shown) to produce movement thereof up and down in accordance with the direction of operation of the drive means 12 and the yieldable coupling 18 positioned between the window drive means 12 and linkage 16.

In operation the drive means 12 is actuated in opposite directions to drive the window moving linkage 16 at a substantially uniform speed through the yieldable coupling 18 until a predetermined torque is applied to the coupling. After a predetermined torque is applied to the yieldable coupling 18 it yields to prevent jamming of the vehicle window lift structure.

More specifically drive means 12 comprises the reversible electric motor 20 mounted on door panel 14 in housing 22. Electric motor 20 is operable on being energized by electrical energy over conductors 24 from a source of electrical energy (not shown) to produce rotation of motor shaft 26 mounted in bearings 28, 29 and 30 in housing 22. Rotation of motor shaft 26 thus produces rotation of worm 32 secured to the end 34 of motor drive shaft 26 for rotation therewith.

Window linkage 16 is indicated graphically by the sector 36 shown engaged with the driving pinion 38 of the yieldable coupling 18. It will be understood that the linkage 16 includes a plurality of pivots and levers such as are usual in vehicle window lift structures connected to the sector to produce up or down movement of a window associated therewith on movement of the sector 36 in the direction of arrows 40 on rotation of driving pinion 38. Such window linkages are known and will not therefore be considered in detail herein.

Figure 2:
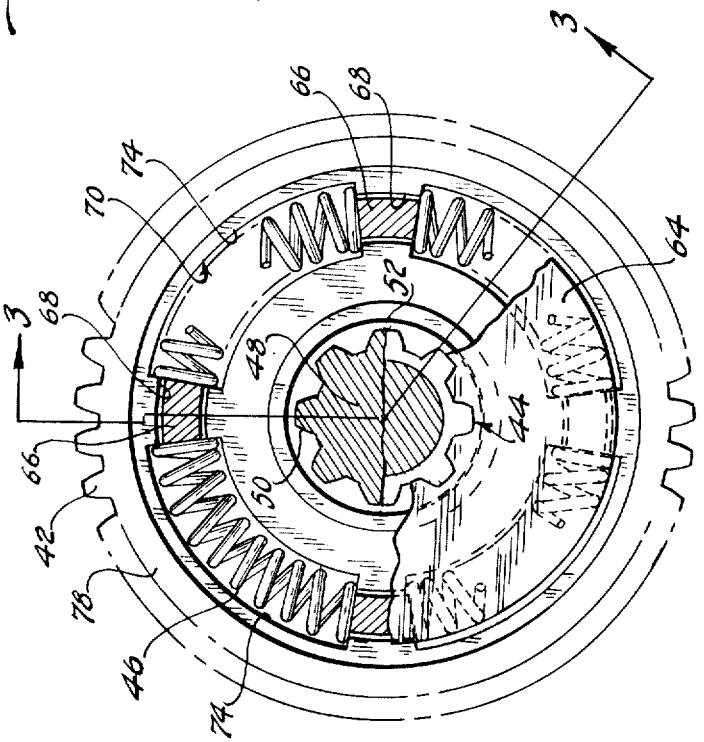
FIGURE 2 is an enlarged elevation view of the yieldable coupling portion of the window lift structure illustrated in FIGURE 1 disengaged from the driving pinion and removed from the housing therefor.

The yieldable coupling 18 of the invention includes the worm gear 42 rotatably mounted on the pinion mechanism 44, pinion mechanism 44 and the springs 46 operable between the worm gear 42 and pinion mechanism 44, as best shown in FIGURES 2 and 3.

The pinion mechanism 44 comprises a shaft 48 having different diameter spline, bearing and pinion portions 50, 52 and 54 positioned between the ends 56 and 58 thereof, as best shown in FIGURE 3. The opposite ends 56 and 58 of the shaft 48 are journaled for rotation in the housing cover 60 and bearing 62. Bearing 62 may for example be secured to the door panel 14.

The plate 64 is splined to the spline portion 50 of the shaft 48 for rotation with the shaft 48 and is provided with a plurality of torque transferring tabs 66 extending substantially perpendicularly thereto and into the portions 68 of the annular recess 70 in the worm gear 42, as shown in FIGURE 3. The tabs 66 are of relatively short circumferential extent, as indicated in FIGURE 2 and extend between the ends of the resilient means 46 positioned in the portions 74 of the annular recess 70 in the worm gear 42.

Worm gear 42 is rotatably received on the bearing portion 52 of the shaft 48 of the pinion mechanism 44 while the sector 36 is engaged with the driving pinion portion 54 of the shaft 48 of the pinion mechanism 44.

The worm gear 42 which, as indicated above, is rotatably supported on the bearing portion 52 of the shaft 48 in turn supports the housing portion 76 engageable with the housing cover 60 to substantially enclose the worm gear 42 and is in driven engagement with the worm 32 as best shown in FIGURE 1. Worm gear 42, as previously indicated, includes the annular recess 70 in the side 78 thereof having the larger portions 74 and the smaller portions 68.

The coil springs 46 are positioned within the larger portions 74 of the recess 70 as previously indicated. As installed the springs 46 abut the ends of the portions 74 of the recess 70 and are prestressed whereby on rotation of the worm gear 42 torque is transferred directly to the plate 64 through the engagement of tabs 66 thereon with the ends of the springs 46 at torque forces insufficient to overcome the prestressing of the springs 46. Yielding between the plate 64 and therefore the pinion portion 54 of the shaft 48 of pinion mechanism 44 and the worm gear 42 will occur when the torque applied therebetween exceeds the prestressing of the springs 46.

The materials of which the flexible coupling 18 is constructed may vary. In one particular instance the pinion mechanism 44 has been constructed entirely of metal while the worm gear 42 has been plastic, such as Delrin or nylon.

In operation, assuming it is desired to rotate the sector 36 in a clockwise direction to raise a vehicle window connected thereto, the electric motor 20 is energized through appropriate switches (not shown) to rotate the worm 32 in a direction to cause the desired clockwise motion of the sector 36. Worm gear 42 is thus caused to rotate and to transfer torque from the motor drive shaft 26 to the pinion portion of the shaft 48 of the pinion mechanism 44 through the prestressed springs 46 abutting against the ends of the portions 74 of the annular recess 70, the tabs 66 on the plate 64 abutting the ends of spring 46 and the plate 64 splined to the portion 50 of the shaft 48.

Uniform upward movement of a window associated with the sector 36 will then occur until an obstruction is encountered thereby which is sufficient to overcome the prestressing of the springs 46. When such obstruction is encountered by the window associated with the sector 36 the worm gear 42 will be rotated relative to the plate 64 to compress the springs 46 in the portions 74 of the recess 70.

Thus it will be seen that with proper prestressing of the springs 46 that the usual variations of stresses encountered in raising and lowering vehicle windows will produce no relative rotation between the plate 64 and worm gear 42 so that uniform movement of the window up or down may be accomplished. The relatively greater torque applied between the plate 64 and worm gear 42 due to inertia of the motor 20 and sudden limiting of the movement of the window due to full opening or full closing thereof will produce relative rotation between the plate 64 and worm gear 42 to relieve stresses in the coupling which might otherwise produce jamming of the window structure.

While one embodiment of the present invention has been considered in detail it will be understood that other embodiments and modifications thereof are contemplated. It is therefore the intention to include within the scope of the invention all embodiments and modifications thereof defined by the appended claims.

What I claim as my invention is:

1. A yieldable coupling for use in conjunction with a window lift gear or the like operable to automatically raise and lower a window in response to operation of a reversible electric motor comprising a shaft having a bearing stub at each end thereof and including a pinion portion adjacent one end, a centrally located bearing portion and a reduced diameter splined other end portion, said pinion portion of said shaft being adapted to mesh with the window lift gear, a worm gear rotatably mounted on the central portion of said shaft adapted to be driven in opposite directions by the reversible electric motor including a first recess in one side thereof having a bottom formed by a portion of said worm gear and an annular recess in the portion of the gear forming the bottom of said first recess including alternate angularly spaced apart large and small portions, an annular plate including internal splines sleeved over and splined to the other end of said shaft is positioned within said first recess and includes tabs extending from one side thereof into the small portions of said annular recess and coil springs positioned within the large portions of the annular recess abutted against the opposite ends of said large portions for producing rotation of said plate and shaft on rotation of said worm gear, and means for rotatably supporting the bearing stubs at the opposite ends of said shaft.

2. A yieldable coupling for use in conjunction with a window lift gear or the like operable to automatically raise and lower a window in response to operation of a reversible electric motor comprising a shaft having a bearing stub at each end thereof and including a pinion portion adjacent one end, a centrally located bearing portion and a reduced diameter splined other end portion, said pinion portion of said shaft being adapted to mesh with the window lift gear, a worm gear rotatably mounted on the central portion of said shaft adapted to be driven in opposite directions by the reversible electric motor including an annular recess in one side thereof having alternate angularly spaced apart large and small portions, an annular plate including internal splines sleeved over and splined to the other end of said shaft and including tabs extending from one side thereof into the small portions of said annular recess and coil springs positioned within the large portions of the annular recess abutted against the opposite ends of said large portions for producing rotation of said plate and shaft on rotation of said worm gear, and means for rotatably supporting the bearing stubs at the opposite ends of said shaft.

3. A yieldable coupling comprising a rotatably mounted shaft including a pinion portion adjacent one end, a centrally located bearing portion and a reduced diameter splined other end portion, a worm gear rotatably mounted on the central portion of said shaft adapted to be driven in opposite directions including an annular recess in one side thereof having alternate angularly spaced apart large and small portions, an annular plate including internal splines sleeved over and splined to the other end of said shaft and having tabs extending from one side thereof into the small portions of said annular recess and coil springs positioned within the large portions of the annular recess abutted against the opposite ends of said large portions for producing rotation of said plate and shaft on rotation of said worm gear.

4. A yieldable coupling comprising a shaft having a central bearing portion between a splined end portion and a pinion end portion, a worm gear rotatably mounted on the bearing portion of said shaft having a recess in one side thereof, an annular plate having internal splines thereon sleeved over the shaft with the internal splines engaged with the external splines on the splined portion of said shaft and positioned within said recess in said worm gear, and resilient means within said recess and operable between the annular plate and worm gear for transmitting torque therebetween.

5. Structure as set forth in claim 4 wherein the resilient means is a prestressed spring.

6. A yieldable coupling comprising a shaft having a pinion portion, a bearing portion and a splined portion, a worm gear rotatably mounted on the bearing portion of said shaft and having an annular recess therein having angularly spaced apart alternate large and small portions, an annular plate having internal splines thereon sleeved over the shaft with the internal splines engaged with the external splines on splined portion of said shaft and including a plurality of tabs extending therefrom into the small portions of the recess in the worm gear and individual coil springs positioned within the large portions of said recess in abutment with the ends of said large portions for transmitting torque between the worm gear and plate.

*7. A yieldable coupling comprising a worm gear having a recess in one side thereof, a pinion member positioned within and extending out of the worm gear, and resilient means within said recess operable between the worm gear and pinion member for transmitting torque therebetween.*

*8. A yieldable coupling comprising a shaft having a bearing portion, a splined end portion and a pinion end portion, a worm gear rotatably mounted on the bearing portion of said shaft having a recess in one side thereof, and resilient means positioned entirely within said recess and operable between the shaft and worm gear for transmitting torque therebetween.*

*9. A yieldable coupling comprising a worm gear having a recess in one side thereof, a pinion positioned immediately adjacent the worm gear, pinion supporting means positioned within said worm gear fixed to the pinion for rotation with the pinion and rotatably supporting the pinion relative to the worm gear, and resilient means entirely within said recess operable between the worm gear and pinion supporting means for transmitting torque therebetween.*

References Cited

The following references, cited by the Examiner, are of record in the patented file of this patent or the original patent.

UNITED STATES PATENTS

| | | | |
|---|---|---|---|
| 1,854,941 | 4/1932 | Kiel | 74—411 |
| 1,895,751 | 1/1933 | Bülow | 64—27 |
| 2,500,393 | 3/1950 | Williams | 74—411 X |
| 2,928,288 | 3/1960 | Bliss et al. | 74—411 |
| 2,206,925 | 7/1940 | Stout | 74—411 |
| 2,817,512 | 12/1957 | Christen | 268—124 |
| 3,062,527 | 11/1962 | Hoag et al. | 268—121 |
| 3,088,727 | 5/1963 | Pelagatti | 74—411 |

FOREIGN PATENTS

| | | |
|---|---|---|
| 1,084,755 | 7/1954 | France. |
| 811,173 | 8/1951 | Germany. |
| 12,848 | 6/1898 | Great Britain. |

DONLEY J. STOCKING, *Primary Examiner.*

LEONARD H. GERIN, *Examiner.*

UNITED STATES PATENT OFFICE
CERTIFICATE OF CORRECTION

Reissue No. 26,356 March 5, 1968

Joseph Pickles

It is hereby certified that error appears in the above numbered patent requiring correction and that the said Letters Patent should read as corrected below.

In the grant, line 2, for "assignor to Ferro Stamping Company, of Detroit, Michigan," read -- assignor to Ferro Manufacturing Corporation, --; line 15, for "Ferro Stamping Company, its succssors" read -- Ferro Manufacturing Corporation, its successors --; in the heading to the printed specification, lines 3 and 4, for "assignor to Ferro Stamping Company, Detroit, Mich." read -- assignor to Ferro Manufacturing Corporation --.

Signed and sealed this 6th day of May 1969.

(SEAL)
Attest:

EDWARD M.FLETCHER,JR.
Attesting Officer

Edward J. Brenner
Commissioner of Patents